United States Patent [19]

Jordan et al.

[11] Patent Number: 4,466,033
[45] Date of Patent: Aug. 14, 1984

[54] DISK DRIVE WITH AUTOMATIC DISC CLAMPING AND EJECTING

[75] Inventors: Richard Jordan, Los Altos; William Bull, Sunnyvale; Robert L. Ciardella, Saratoga; Robert Taggart, Portola Valley; Frederick R. Holt, Cupertino, all of Calif.

[73] Assignee: Apple Computer, Inc., Cupertino, Calif.

[21] Appl. No.: 351,652

[22] Filed: Feb. 24, 1982

[51] Int. Cl.³ .................... G11B 17/02; G11B 5/016
[52] U.S. Cl. .................................................. 360/99
[58] Field of Search ................ 360/97, 98, 99, 106

[56] References Cited

U.S. PATENT DOCUMENTS 4,193,102 3/1980 Beuch ............................... 360/99
4,359,762 11/1982 Stollorz ............................ 360/98

FOREIGN PATENT DOCUMENTS 0010172 4/1980 European Pat. Off. .
0042061 12/1981 European Pat. Off. .
1466809 3/1977 United Kingdom .
2016794 8/1982 United Kingdom .

*Primary Examiner*—Bernard Konick
*Assistant Examiner*—Paul Stefanski
*Attorney, Agent, or Firm*—Blakely, Sokoloff, Taylor & Zafman

[57] ABSTRACT

A floppy disk drive with automatic disc clamping and ejection is disclosed. The movement of the linear actuator is used to provide both the clamping and ejection, without other drive means. A pair of magnetic heads, positioned on opposing sides of a drive wheel, are fixed to a carriage, one engages the upper surface of the disc, the other the lower surface. Neither head moves relative to the other. The drive components are easily assembled providing a relatively inexpensive, yet reliable drive.

9 Claims, 12 Drawing Figures

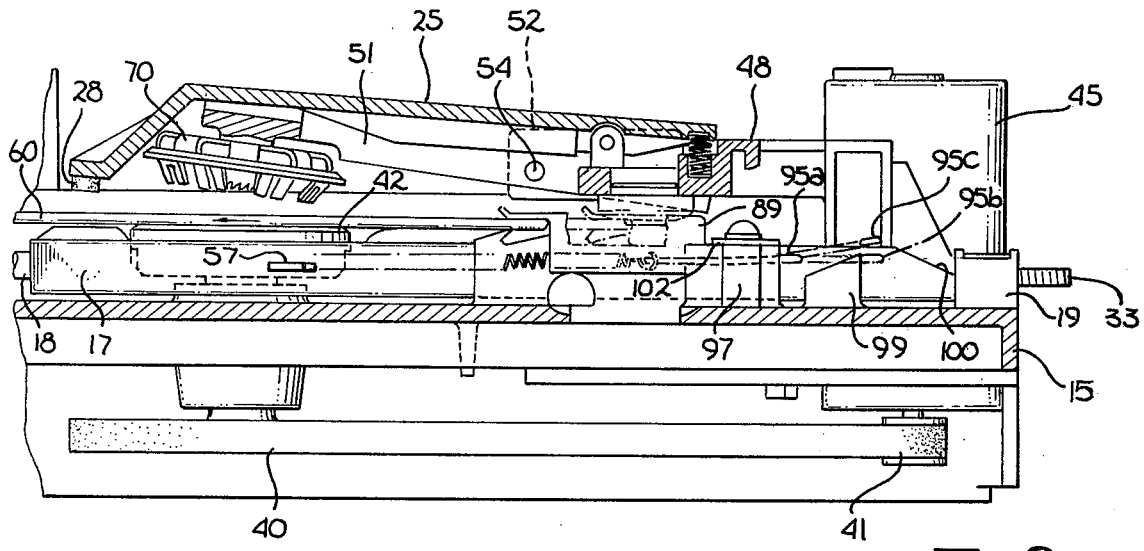
Fig. 9
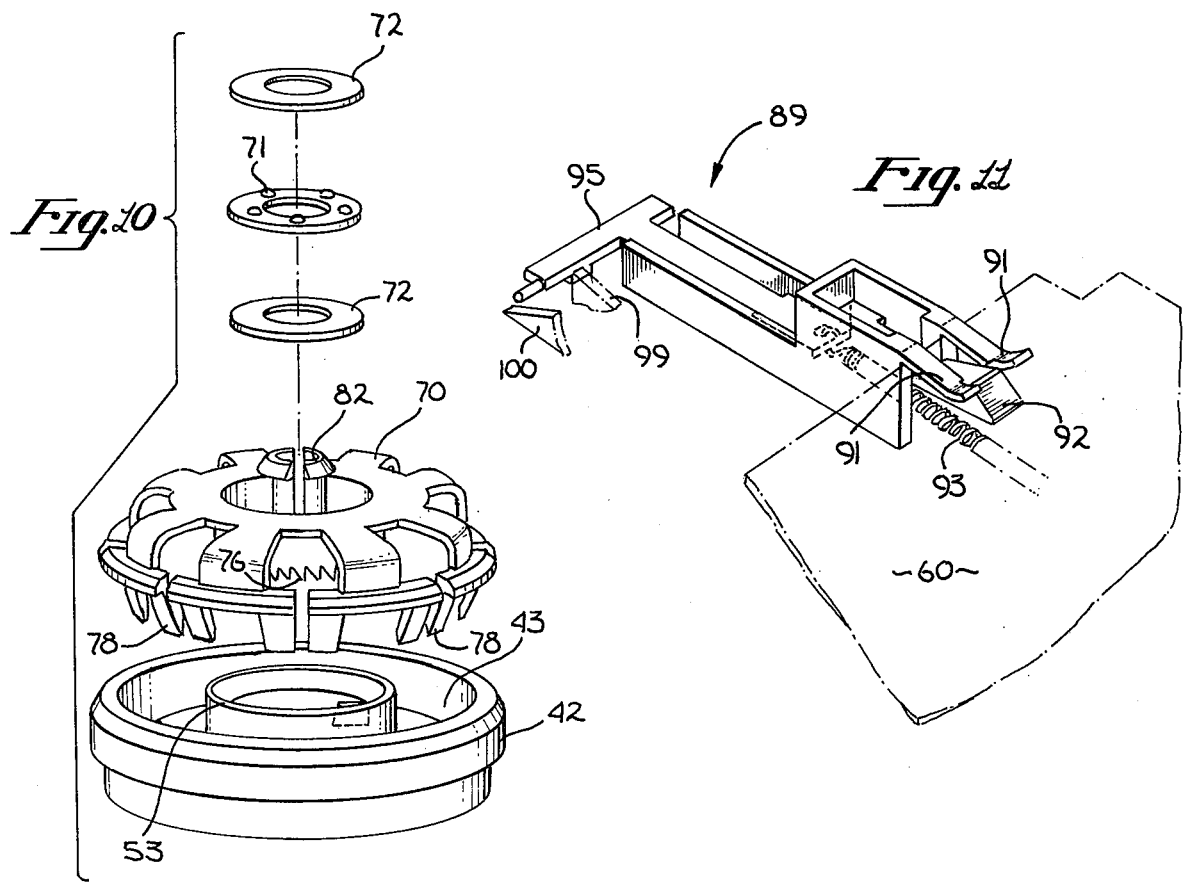
Fig. 10
Fig. 11

4,466,033

DISK DRIVE WITH AUTOMATIC DISC CLAMPING AND EJECTING

BACKGROUND OF THE INVENTION

1. Field of the Invention

The invention relates to the field of drives for magnetic discs, particularly "floppy" disc.

2. Prior Art

There are numerous commercially available floppy disc drives which have been marketed in large quantities for several years. For the most part, these disc drives require that the disc be manually clamped once the disc is inserted (before rotation) and, manually removed after use. As will be seen, the invented disc drive provides automatic clamping of a disc, and also automatic ejection. Importantly, these two features are obtained without additional drive mechanisms. Both features result from movement of the linear actuator used to position the magnetic heads. Several attempts have been made to provide a reliable floppy disc drive at a reasonable cost which reads and writes information onto both sides of a disc. In one prior art disc drive, the upper and lower heads are disposed one directly above the other. This has proven to be a cumbersome and unreliable arrangement, particularly since it requires movement of one of the heads in order to insert and remove the floppy disc. The invented disc drive permits access to both sides of the disc. With a unique arrangement of the magnetic heads, neither head is moved for the insertion or removal of a disc.

Floppy disc drives have become widely used in countless computer systems including the personal computer field. This wide distribution has increased the need for an inexpensive, yet reliable disc drive. As will be seen, the described disc drive is readily assembled with fewer critical parts when compared to prior art drives. The simplicity of the overall design provides improved reliability.

SUMMARY OF THE INVENTION

A floppy disc drive which includes automatic disc clamping and ejection is described. A drive assembly which includes a spindle assembly for engaging and rotating a disc is mounted on a base. A carriage assembly is secured on rails to the base for reciprocating movement under the control of a linear actuator. The carriage extends about opposite sides of the drive wheel. A first magnetic head is mounted on the carriage on one side of the drive wheel for engaging one surface of the disc. A second magnetic head is mounted on the carriage on the opposite side of the drive wheel for engaging the opposite side of the disc. Clamping means including a clamper, automatically engages the disc and drive wheel when the carriage is actuated. An overcenter mechanism disposed between the clamping means provides this automatic engagement and disengagement. A springloaded ejector is loaded by the manual insertion of the disc. A ramp on the carriage releases the ejector body when the carriage is moved into a predetermined position, thereby ejecting the disc.

BRIEF DESCRIPTION OF THE DRAWINGS

FIG. 9 is a cross-sectional elevation view of the disc drive taken generally through section 9—9 of FIG. 1. This view is used to show the movement of the ejector mechanism.

FIG. 10 is a perspective view showing, in assembly form, the clamper, drive wheel and clamper trust bearing.

FIG. 11 is a perspective view showing the ejector body and its engagement with a disc.

FIG. 12 is a vertical cross-section of a photo-sensor assembly used to calibrate the position of the carriage.

DETAILED DESCRIPTION OF THE INVENTION

Figure 1:
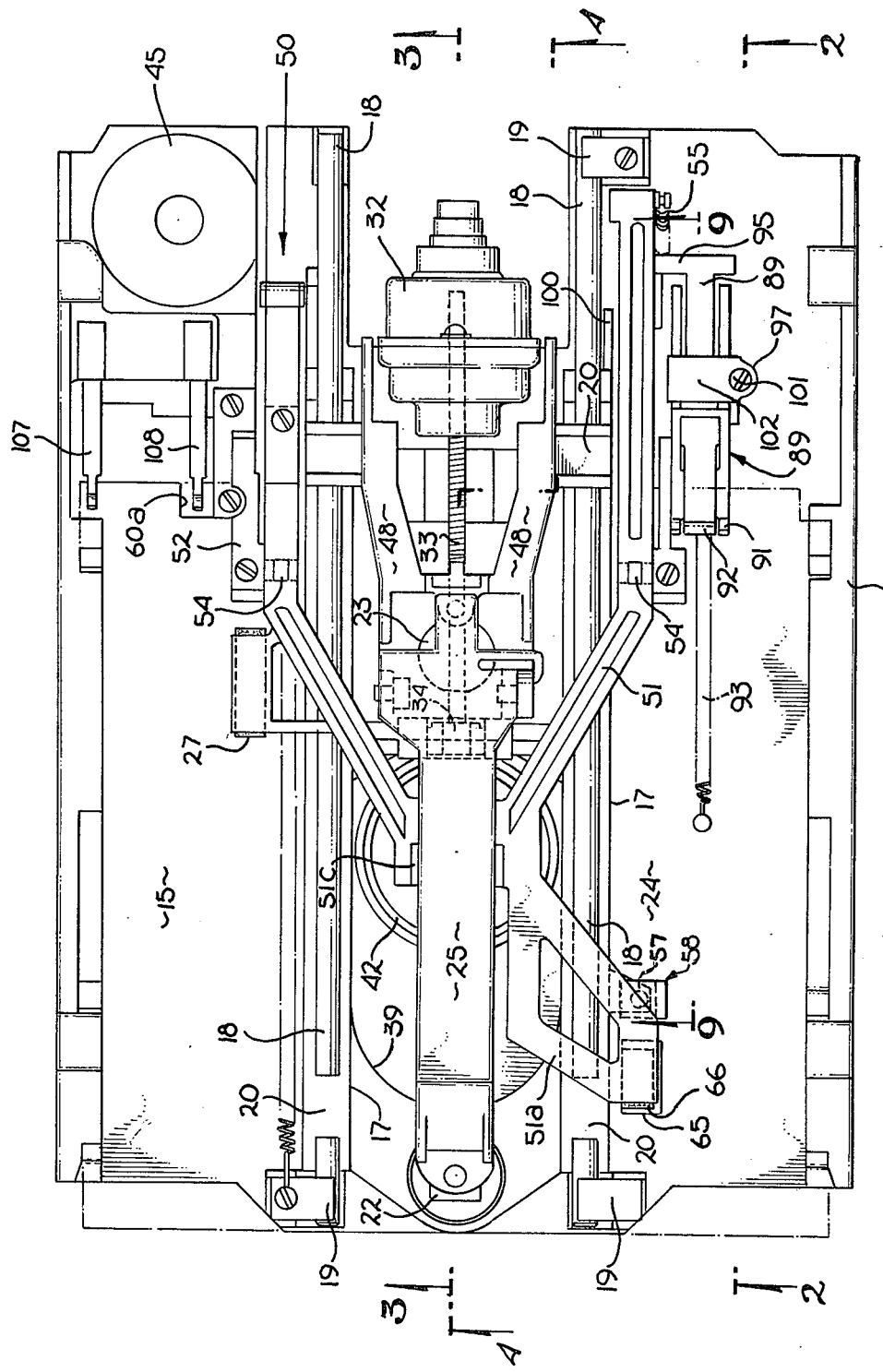
FIG. 1 is a plan view of the invented disc drive showing the lifter arm in its lower position.

A disc drive is described which is particularly suitable for use with floppy discs. In the following description, numerous specific parts are described in detail in order to provide a thorough understanding of the present invention. However, it will be obvious to one skilled in the art that the inventive concepts described may be employed without the described embodiments. In other instances, well-known parts have not been described in detail in order not to obscure the present invention in unnecessary detail.

The main components of the invented disc drive generally comprise: (1) a base 15 shown well in the cross-sectional elevation view of FIG. 5; (2) a spindle assembly 36 which includes the drive wheel 42 and the related drive motor and pulleys also shown in FIG. 5; (3) a carriage 17, driven by a linear actuator which includes motor 32, the magnetic heads 22 and 23 are affixed to this carriage (See FIG. 1); (4) a lifter arm 51 which includes a clamper 70 for clamping a disc to the drive wheel 42 (See FIG. 1); and, (5) an ejector mechanism for ejecting a disc which includes the ejector body 89 of FIG. 11. Other miscellaneous components include function switches 107 and 108 and other parts as shall be described.

In the presently preferred embodiment the body 15 (See FIG. 1 and FIG. 5) is a generally elongated, H-shaped metal casting which includes an upper surface 24 on which the carriage assembly and lifter arm are mounted. A hub and centrally disposed bore are formed in the body 15 allowing it to receive the spindle assembly 36. Grooves 21 are formed on opposite inner surfaces of the upright sides of the body 15 so that a disc 60 may be retained within the body. Numerous other attaching points, bosses, and the like are integrally formed with the body 15; they are described below, where pertinent to the present invention.

Figure 5:
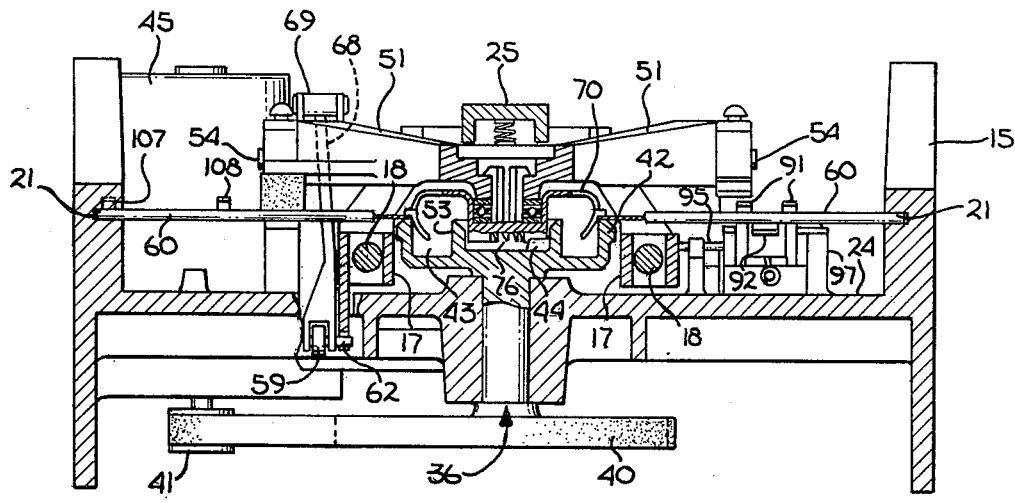
FIG. 5 is a cross-sectional front view of the disc drive taken generally through section line 5—5 of FIG. 1.
Figure 6:
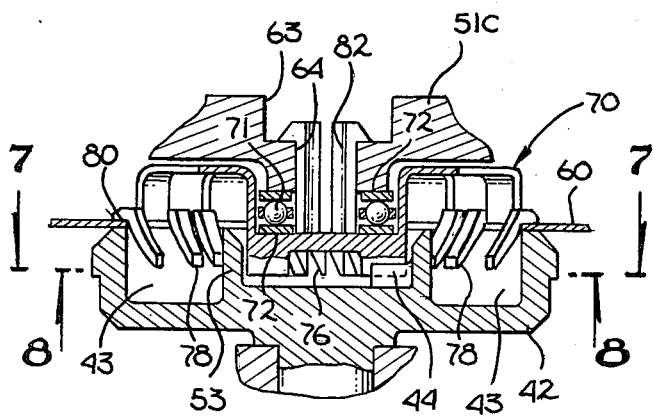
FIG. 6 is an exploded view of a portion of the spindle assembly of FIG. 5.
Figure 7:
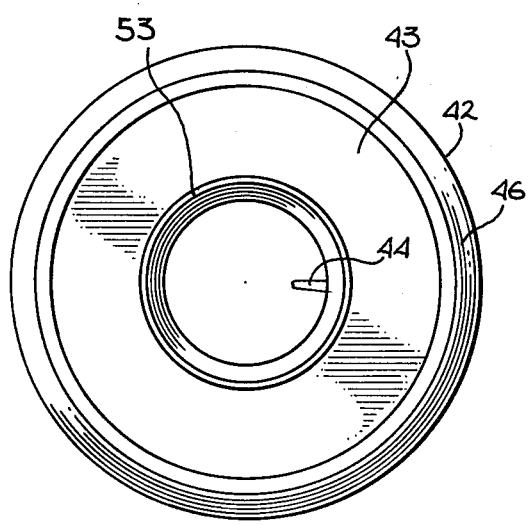
FIG. 7 is a plan view of the drive wheel of the spindle assembly, generally taken through section line 7—7 of FIG. 6.

The spindle assembly includes at its upper end, a drive wheel 42 best illustrated in FIGS. 5, 6, and 7. The wheel 42 is coupled through a shaft to a flywheel 40. Bearings are provided to allow the wheel, shaft and flywheel 40 to rotate freely within the body 15. The upper surface of the wheel 42 includes an annular surface 46, the inner circumference of which aligns with the centrally disposed bore of a floppy disc. A recess 43 is defined by the wheel 42 within the interior of the annular surface 46. Fingers 78 from the clamper 70 extend into this recess as will be described. As best shown in FIGS. 7 and 10, a centering cylinder 53 extends upward from the central portion of the wheel 42, which as will be discussed below, surrounds the central portion of clamper 70 during operation to insure direct coupling and alignment between wheel 42 and clamper 70. A radially disposed nub 44 extends upward from the interior of centering cylinder 53 to provide a direct drive coupling engagement with teeth 76 of clamper 70.

The rim of the drive wheel 40 is crowned to receive a belt which interconnects the drive wheel with a pulley wheel 41. This pulley wheel is directly driven by an electric motor 45. Once the motor is activated with a disc in place, the disc is rotated at a predetermined rate of rotation.

Figure 4:
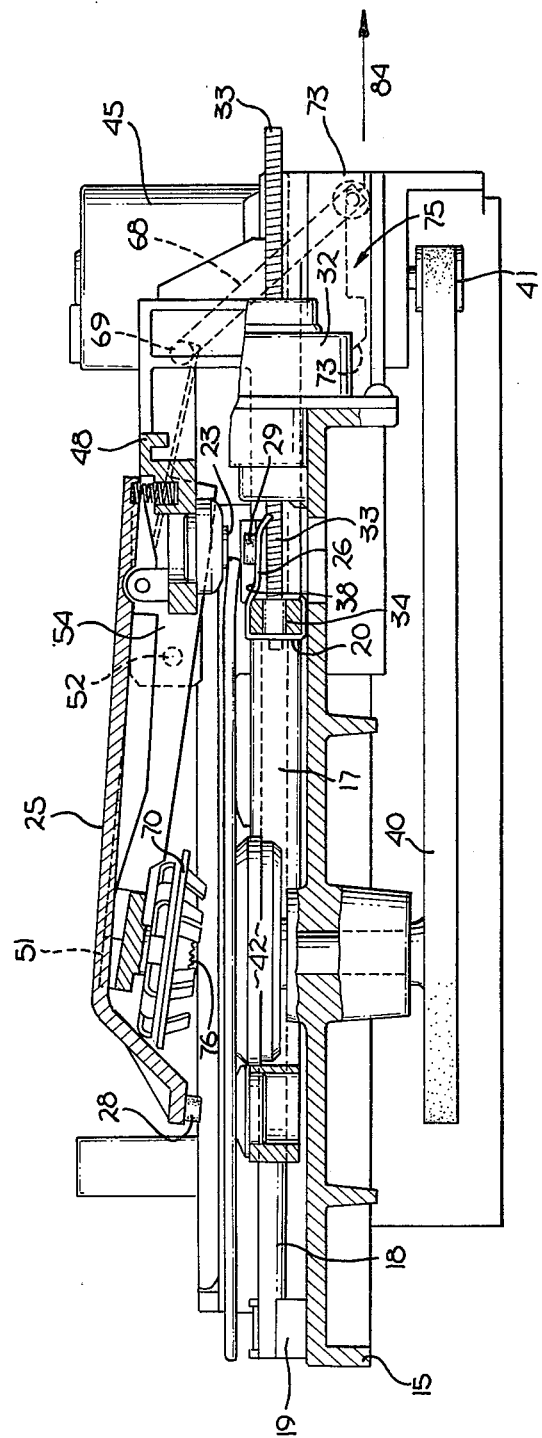
FIG. 4 is a cross-sectional elevation view of the disc drive of FIG. 1 showing the lifter arm in its raised position, this view is generally taken through the staggered section line 4—4 of FIG. 1.

Referring primarily to FIGS. 1 and 4, the carriage 17 includes a lower, generally rectangular section and an integrally formed upper carriage section 48. The carriage 17 includes sleeves 20 which engage the rails 18. These rails are mounted at mounts 19 above the surface 24 of body 15. The carriage is thus able to move in a reciprocating fashion along the rails from one end to the other of the body 15. The carriage 17 includes a generally centrally disposed, elliptically shaped opening 39 (FIG. 1) which encircles the disc drive wheel 42.

The carriage is driven by a linear actuator which consists of a stepping motor 32, a lead screw 33 and a lead screw nut 34 which is attached to the carriage.

A pair of magnetic heads are affixed to the carriage on opposite sides of the drive wheel 42. The first head 22 is affixed to the forward portion of the carriage 17 (see FIG. 1) and faces upward so that it may contact the underside of a disc engaging the disc drive. The second magnetic head 23 is affixed to the upper carriage portion 48 and faces downward such that it may engage the upper surface of a disc. It is important to note that with this arrangement both heads remain fixed to the carriage; this allows the heads to remain at a precise fixed distance from one another.

A leaf spring 25 extends from the upper carriage portion 48 as best seen in FIG. 1 to a position above the magnetic head 22. A resilient pad 28 is affixed to the lower surface of the spring 25 over the head 22. The spring 25 urges the pad against the disc 60 assuring that the disc 60 contacts the head 22 when the lifter arm 51 is in its lower position. The spring 25 passes over a portion 51c (See FIG. 1) of the arm 51, and thus when the arm is raised, as best shown in FIG. 4, the pad 28 is moved away from the disc. This prevents interference between the disc and the pad 28 when the disc is inserted or removed. Another spring 26 (see FIG. 4) mounted to the carriage includes an upwardly facing resilient pad 29. Spring 26 urges the disc (through pad 29) against the head 23. The body 15 defines two downwardly facing cams 38. When the carriage is moved rearwardly (in the direction indicated by arrow 84) the spring 26 moves downward, away from the disc allowing the disc to be removed.

Figure 2:
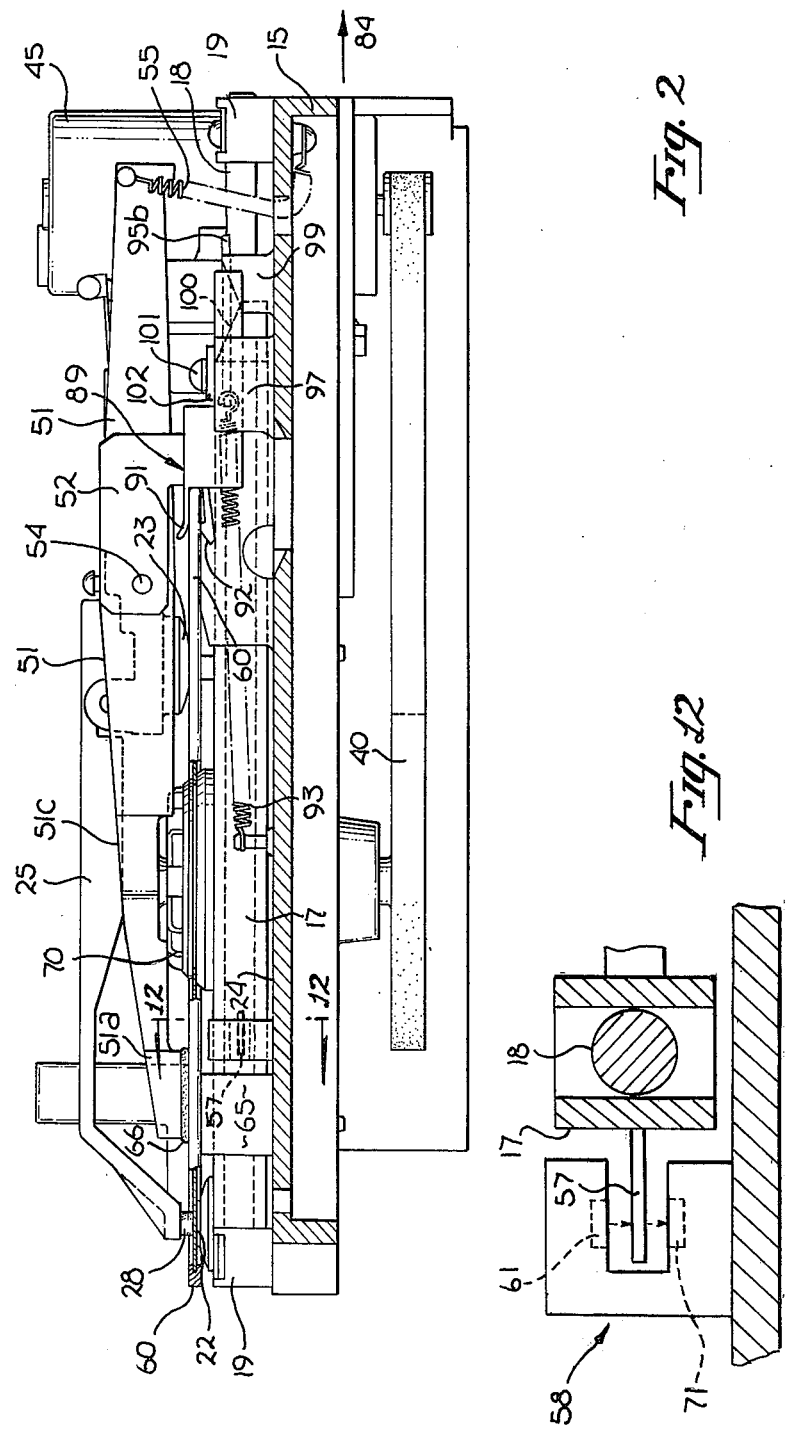
FIG. 2 is a cross-sectional elevation view of the disc drive of FIG. 1 generally taken through section line 2—2 of FIG. 1.

Referring to FIGS. 1, 2 and 4, the lifter arm 51, like the carriage, is a molded plastic member. This irregularly shaped member includes a U-shaped section centered at the portion 51c, and a forward extending beam 51a (FIG. 1). The U-shaped sections of the lifter arm 51 are mounted for pivotal movement on pivots 54. These pivots extend inwardly from the upstanding right-angle shaped supports 52 (FIG. 2). The supports 52 extend upwardly from surface 24 of base 15. One end of the U-shaped section of arm 51 is coupled to the base 15 through a spring 55 best seen in FIG. 2. This spring urges the arm into its raised position, for example, the pad 28 is moved away from head 22. The end of the other U-shaped section of arm 51 includes an overcenter mechanism 50.

Figure 3:
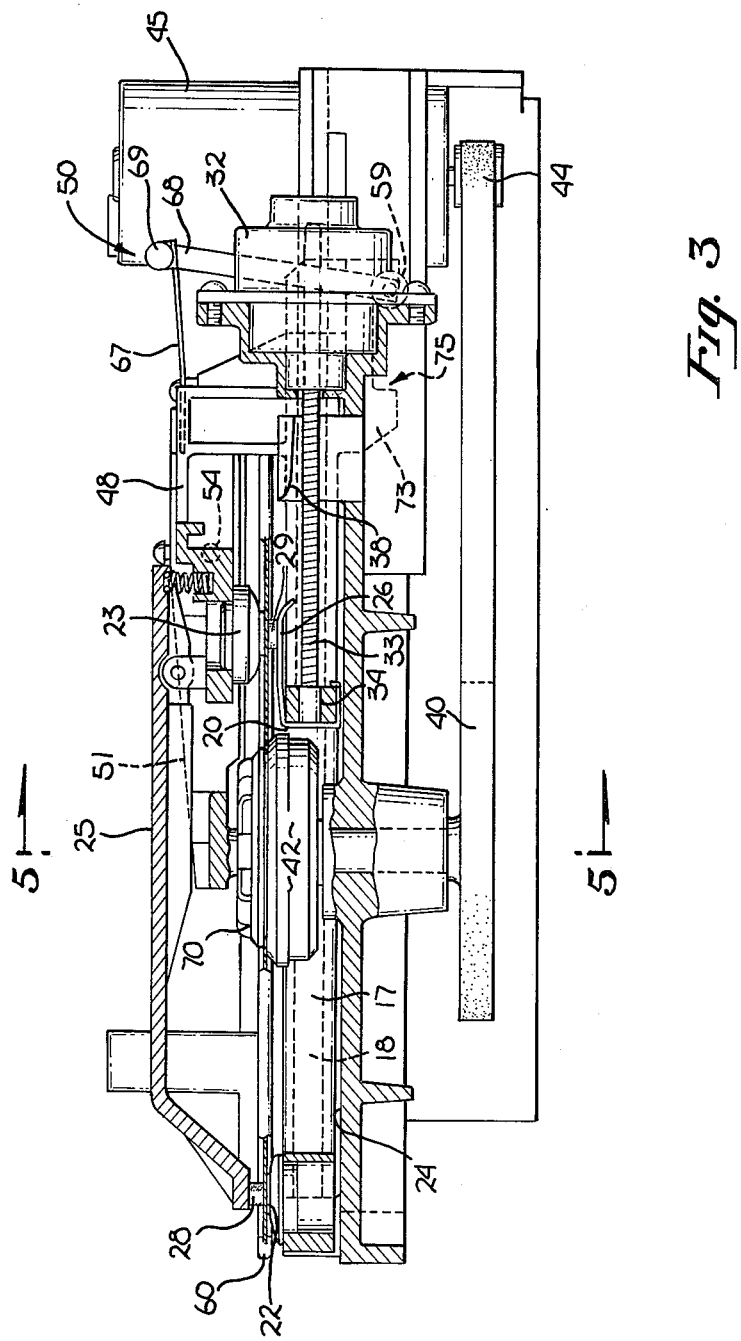
FIG. 3 is a cross-sectional elevation view of the disc drive of FIG. 1 generally taken through section line 3—3 of FIG. 1.

As best seen in FIGS. 3, 4 and 5, the overcenter mechanism includes a leaf spring 67 which extends rearwardly from the arm 51. The spring is hinged at hinge 69 to an arm 68. The free end of arm 68 includes a wheel 59 which rolls on a horizontal surface of the base 15. The axle of this wheel (pin 62 of FIG. 5) extends into a slot 75. This slot is defined between two downwardly extending portions 73 of the carriage. When the carriage is moved to its full forward position, the pin 62 reaches the end of the slot 75 and then the wheel 59 is urged forward (overcenter) to the position shown in FIG. 3. In this position, the spring 67 urges the lifter arm 51 downward and this provides clamping pressure to assure that the disk rotates with the drive wheel 42. Once the overcenter mechanism is locked, the carriage can move to position the heads on the disk without unlocking the mechanism since slot 75 is wide enough to permit such movement. When the carriage is moved to its full rearward position as shown in FIG. 4, the pin 62 contacts the forward end of the slot 75 causing the overcenter mechanism to unlock and assume the position shown in FIG. 4.

The overcenter mechanism has been found to provide ample clamping pressure, and as is apparent, it operates without any manual assistance. Importantly, no additional actuators are required since the mechanism is actuated by the linear actuator used to position the heads on the disc.

The forwardly extending section 51a of the arm 51 (FIG. 1) includes a downwardly facing pad 66. This pad is positioned over a boss 65 which extends upwardly from the base 15. When the arm is in its lower position, the disc with its jacket is disposed between the boss 65 and pad 66. The pressure exerted by the pad against the jacket provides cleaning of the disk in a well-known manner.

Another resilient pad 27 (FIG. 1) is affixed to a lower surface of the arm 51 and when the arm is in its lower position, this pad urges the disc jacket against the disc to also provide cleaning. An upstanding portion of the body 15 extends upward below the pad 27 to provide a lower surface upon which the disc jacket rests.

The portion 51c of the lifter arm includes a pair of concentric bores 63 and 64, best seen in FIG. 6. Bore 64 receives the shaft 82 of the clamper 70. The annular shoulder between the bore 63 and 64 provides a surface for locking the flared end of the split shaft 82.

Figure 8:
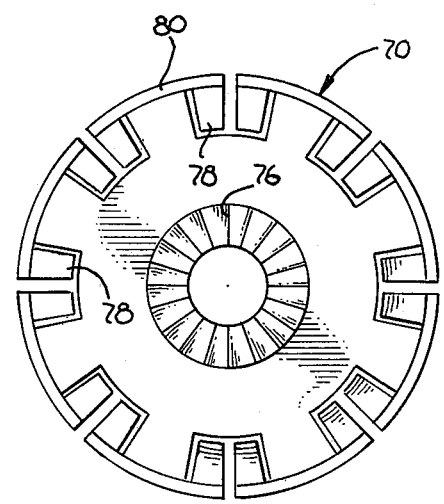
FIG. 8 is a plan view of the clamper taken generally through section line 8—8 of FIG. 6.

The clamper, best seen in FIGS. 8 and 10, is a molded plastic part which includes the shaft 82 with its flared end, and a plurality of flexible fingers 78. In the presently preferred embodiment, clamper 70 is formed out of NORYL 731, a tradename of the General Electric, Co. An annular surface 80 is formed about the fingers 78 and is made to cooperatively engage the surface 46 of the drive wheel 42. The clamper 70 includes a plurality of concentrically disposed teeth 76 which lockingly engage nub 44 to provide coupling between the clamper and the drive wheel. In operation, as will be discussed, the centering cylinder 53 surrounds the outside circumference of teeth 76 to insure that clamper 70 remains substantially centered in the middle of the spindle assembly, thereby maintaining the disk in an on-center configuration. A thrust bearing 71 is disposed between washers 72 on the shaft 82 when the clamper engages the bore 64. This permits the clamper to freely rotate below the arm 51.

One advantage to the clamper 70 is its ease of assembly onto the lifter arm. The washers and thrust bearing 71 are placed on the shaft 82 and then the shaft 82 is snapped into locking engagement within the bores 63 and 64. The shaft 82 is a split member; there is sufficient resiliency for the flared end of the shaft to readily pass through bore 64 before the flared end locks on the shoulder defined between bore 63 and 64.

Referring to FIGS. 1, 2, and 11, the ejector body 89 comprises an elongated molded plastic member defining upper claws 91 and a lower claw 92 at one end, and a perpendicularly disposed finger 95 at the other end. A notch 90 is cut into the disc jacket to allow claw 92 to more securely grip the jacket. The elongated ejector body 89 slides within a track 97. The track is defined by a an upstanding portion of the body member 15. A small plate 102 and a screw 101 retain the ejector body within the track 97. One end of a spring 93 is coupled to the ejector body; the other end of this spring is secured to the forward portion of the body 15. This spring urges the ejector body forward (towards the end of the drive which receives the discs).

The body 15 defines a forward sloping ramp 99, while the carriage includes a ramp 100. When a disc is inserted into the drive, the manual insertion of the disc urges the finger 95 over ramp 99 and causes it to be latched behind the ramp. The ramp 100 when moving in the direction of arrow 84, lifts the finger from its latched position, allowing the spring to move the body member forward thereby ejecting the disc. (Note when the ramp 100 moves in the direction opposite to arrow 84, it does not affect the latched finger 95.) The operation of the ejector mechanism shall be described in greater detail in conjunction with FIG. 9.

Referring now to FIG. 1, the disc drive includes function switches 107 and 108. When a disc is inserted into the drive, these switches are opened (the jacket moves the contacts apart) unless a notch is into the jacket. In FIG. 1, a notch 60a is shown around switch 108 to illustrate that with this notch, switch 108 remains closed. These switches may be used in a plurality of different ways. One switch is used for a protective function and prevents erasing of certain discs, for example, those containing programs. It will be appreciated that while switches 107 and 108 are used in the presently preferred embodiment, both switches may be replaced with a light emitting diode (LED) and photodector combination to achieve substantially the same result. Thus, upon insertion of a disk into the drive, the disk jacket would interrupt the beam emitted by the LED and thereby open or close the circuit in accordance with the particular function desired.

In operation, prior to the insertion of a disc, the carriage is driven by the linear actuator (motor 32 and lead screw 33) to its full rearward position as shown in FIG. 4. This causes the lifter arm 51 to be moved to its upward. In this position, the clamper 70 is moved clear of the drive wheel 42 and the pads, such as pad 28 and 29 are moved clear of the magnetic heads. A disc may be inserted into the disc drive along the grooves 21 shown in FIG. 5.

Once the disc is in place, the linear actuator is activated, causing the carriage to move forward. Upon the first forward movement of the carriage, the wheels 59 roll forward locking the overcenter mechanism (lifter arm down).

Referring to FIG. 6, with disc 60 inserted with the disc drive, the aperture of the disc should be concentric with the drive wheel 42. In this position, the edge of the disc aperture should precisely rest on annular surface 46. As clamper 70 moves downward, centering cylinder 53 surrounds the outer circumference of teeth 76 to insure that clamper 70 is precisely aligned with drive-wheel 42. In practice, it has been found that without cylinder 53 nub 44 during operation tends to drive clamper 70 off-center relative to drive wheel 42. Typically, the fingers 78 of clamper 70 as they move downward into recess 43, urge the disc into concentric registry with the drivewheel. However, the use of centering cylinder 53 insures that precise alignment and a direct engagement between teeth 76 and nub 44 is achieved each time a disk is inserted.

With the clamper in its down position, the disc is held in place between the annular surface 80 of the clamper and the corresponding surface 46 of the drive wheel 42. Also, the nub 44 is urged into engagement with the teeth 76 of the clamper, thereby providing positive coupling between the clamper and the drive wheel. As will be appreciated, the direct coupling between the clamper and the drive wheel provides a driving force of equal magnitude on both surfaces of the disk. The springs 67 provide sufficient pressure to assure that the disc 60 rotates, without slippage, between with the drive wheel 42 and clamper 70.

With reference once again to FIG. 1, the linear actuator drives the carriage fully forward until a wedge shaped blade 57 formed integrally with the carriage interrupts a light beam within a calibration photo-sensor 58. Photo-sensor 58 is mounted, in the presently preferred embodiment, to the base 15 generally adjacent to the carriage near boss 65. As illustrated in FIG. 12, photo-sensor 58 is generally U-shaped and includes a photo-emitter 61, such as for example an LED, and a corresponding photo-detector 71. Emitter 61 and detector 71 are spaced apart so as to allow blade 57 to pass therebetween. Once the carriage moves forward sufficiently to interrupt the light beam, electrical circuitry driving motor 32 senses this interruption and the position of the carriage is calibrated. Thus, both magnetic heads are in predetermined positions with respect to the drive wheel and disc, such that the position of the carriage relative to the disc tracks may be determined after its subsequent movement along the rails 18.

The motor 45 may now be actuated and the disc brought up to speed. The carriage is moved by the linear actuator to the desired track to allow information to be read from or written onto the disc in a well-known manner. Of course, with the opposite facing heads 22 and 23 both sides of the disc can be accessed without removal of the disc.

When it becomes necessary to remove the disc, the linear actuator drives the carriage to its full rearward position as shown in FIG. 4, causing the lifter arm to raise, thereby freeing the disc.

Referring now to FIG. 9, as mentioned, as the disc is initially inserted, the ejector body 89 is moved rearwardly tensioning spring 93. The finger 95 is shown in three positions in FIG. 9 to illustrate its movement. Finger 95a illustrates the position of the finger when the disc is first inserted. As the ejector body is moved rearwardly by the disc the finger moves over the ramp 99 and locks behind the ramp as shown by finger 95b. When the ramp 100, which is part of the carriage, moves rearwardly, it urges the finger over the ramp (finger 95c) allowing the spring 93 to pull the ejector body forward, ejecting the disc. Angle 96 illustrates the ejector cam angle, formed when the ramp 100 urges the finger from behind the ramp 99.

Thus, a disc drive has been described which permits access to both sides of a disc. A single linear actuator drives both magnetic heads, provides clamping for the disc and triggers the ejector mechanism. The disc drive has numerous features which makes it easy to assemble and which provide high reliability.

We claim:

1. A disc drive comprising:
    a base;
    a drive assembly including a drive wheel for engaging and rotating a disc, said drive assembly being mounted to said base;
    a carriage assembly mounted on said base for reciprocating movement;
    a linear actuator coupled to said base for driving said carriage in said reciprocating movement;
    at least one magnetic head mounted on said carriage for engaging said disc;
    a lifter arm pivotally mounted on said base;
    a clamper rotatably mounted on said lifter arm such that as said lifter arm pivots toward said drive wheel, said clamper is brought into engagement with said drive wheel with said disc therebetween to assure rotation of said disc with said drive wheel;
    an overcenter mechanism disposed between said arm and said base, said overcenter mechanism being coupled to said arm to control the pivotal movement of said arm, said mechanism being capable of movement actuated by said reciprocating movement of said carriage such that movement of said carriage to its full rearward position causes pivotal movement of said arm, said pivotal movement occurring only when said carriage is at its full rearward position, thereby causing said clamper to move into said engagement with said drive wheel and to lift from said engagement,
    whereby said disc is automatically clamped for rotation when said linear actuator is actuated.

2. The disc drive defined by claim 1 wherein said drive wheel includes an annular outer surface upon which said disc rests and a recessed surface within said annular surface, and wherein said clamper includes an outer annular surface for engaging said annular surface of said drive wheel.

3. The disc drive defined by claim 2 wherein said clamper includes resilient fingers which extend into said recess of said drive wheel when said clamper is in said engagement with said drive wheel, said fingers for providing alignment of said disc on said drive wheel.

4. The disc drive defined by claim 3 including a thrust bearing disposed between said clamper and said lifter arm.

5. The disc drive defined by claim 1 including coupling means on said clamper and said disc wheel to assure rotation of said clamper with said drive wheel when said clamper is in said engagement with said drive wheel.

6. The disc drive defined by claim 1 wherein said carriage extends about opposite sides of said drive wheel and wherein said one magnetic head is mounted on said carriage on one side of said drive wheel to engage one surface of said disc and wherein a second head is mounted on said carriage on the opposite side of said drive wheel to engage the opposite side of said disc.

7. The disc drive defined in claim 1 further comprising:
    an ejector means for ejecting said disc from said disc drive, said ejector means being tripped by said carriage movement thereby causing said disc to be ejected,
    whereby said disc is automatically clamped and ejected by movement of said carriage.

8. The disc drive defined in claim 7 wherein said ejector means is spring-loaded by the manual insertion of said disc into said disc drive.

9. The disc drive defined by claim 8 wherein said tripping of said ejector means is caused by a ramped surface on said carriage.

* * * * *